(12) United States Patent
Prouzet

(10) Patent No.: US 10,726,075 B2
(45) Date of Patent: Jul. 28, 2020

(54) STREAMLINING AND SEARCHING DOCUMENT TEXT

(71) Applicant: IMI: INTELLIGENCE & MANAGEMENT OF INFORMATION INC., Montreal (CA)

(72) Inventor: Eric Pierre Prouzet, Waterloo (CA)

(73) Assignee: IMI: INTELLIGENCE & MANAGEMENT OF INFORMATION INC., Montreal (CA)

( * ) Notice: Subject to any disclaimer, the term of this patent is extended or adjusted under 35 U.S.C. 154(b) by 199 days.

(21) Appl. No.: 15/770,921

(22) PCT Filed: Oct. 3, 2016

(86) PCT No.: PCT/IB2016/055910
§ 371 (c)(1),
(2) Date: Apr. 25, 2018

(87) PCT Pub. No.: WO2017/081562
PCT Pub. Date: May 18, 2017

(65) Prior Publication Data
US 2018/0314695 A1    Nov. 1, 2018

Related U.S. Application Data

(60) Provisional application No. 62/233,334, filed on Nov. 9, 2015.

(51) Int. Cl.
*G06F 16/93* (2019.01)
*G06F 16/31* (2019.01)
(Continued)

(52) U.S. Cl.
CPC ............ *G06F 16/93* (2019.01); *G06F 16/313* (2019.01); *G06F 16/353* (2019.01); *G06F 16/90344* (2019.01)

(58) Field of Classification Search
CPC ...... G06F 16/93; G06F 16/313; G06F 16/353; G06F 16/90344
See application file for complete search history.

(56) References Cited

U.S. PATENT DOCUMENTS 8,055,669 B1 * 11/2011 Singhal ............... G06F 16/3322
707/765
2005/0198070 A1    9/2005 Lowry
(Continued)

OTHER PUBLICATIONS

Song, Ruihua et al., "Viewing Term Proximity From a Different Perspective", ECIR 2008, LNCS 4956, pp. 346-357. (Year: 2008).*
(Continued)

*Primary Examiner* — Scott A. Waldron
(74) *Attorney, Agent, or Firm* — Perry + Currier

(57) ABSTRACT

A method of processing a document for searching includes obtaining document text, and generating streamlined document text. The streamlined document text is generated by: (i) discarding a plurality of strings from the document text that match any of a plurality of preconfigured low-relevance strings to generate condensed document text; (ii) in the condensed document text, replacing a plurality of content strings with respective ones of a plurality of preconfigured content class identifiers. The method further includes determining respective frequency values indicating the frequency of the content class identifiers in the streamlined document text; determining a proximity value for at least one pair of the content class identifiers in the streamlined document text; and storing a subset of the frequency values and the proximity value in the memory.

13 Claims, 14 Drawing Sheets

(51) Int. Cl.
   *G06F 16/903*   (2019.01)
   *G06F 16/35*   (2019.01)

(56) References Cited

U.S. PATENT DOCUMENTS

| | | | |
|---|---|---|---|
| 2007/0174255 A1* | 7/2007 | Sravanapudi | G06F 16/353 |
| 2008/0228748 A1* | 9/2008 | Fairweather | G06F 16/3332 |
| 2014/0164408 A1 | 6/2014 | Dubbels | |
| 2015/0134666 A1* | 5/2015 | Gattiker | G06F 16/334 |
| | | | 707/739 |
| 2015/0169734 A1 | 6/2015 | Jain et al. | |

OTHER PUBLICATIONS

Zhao, Jinglei & Yun, Yeogirl, "A Proximity Language Model for Information Retrieval", ACM SIGIR'09, pp. 291-298. (Year: 2009).*

International Search Report dated Dec. 15, 2016 for PCT International Application No. PCT/IB2016/055910.

Written Opinion of the International Searching Authority dated Dec. 15, 2016 for PCT International Application No. PCT/IB2016/055910.

WIPO/IB, International Preliminary Report on Patentability, dated May 15, 2018, re PCT International Patent Application No. PCT/IB2016/055910.

* cited by examiner

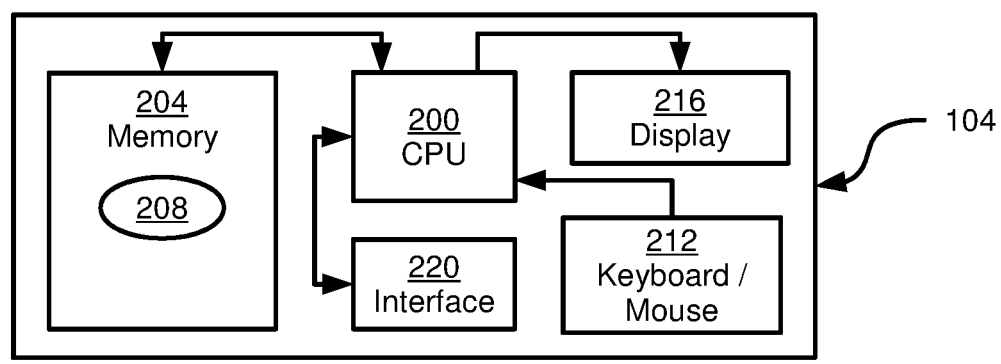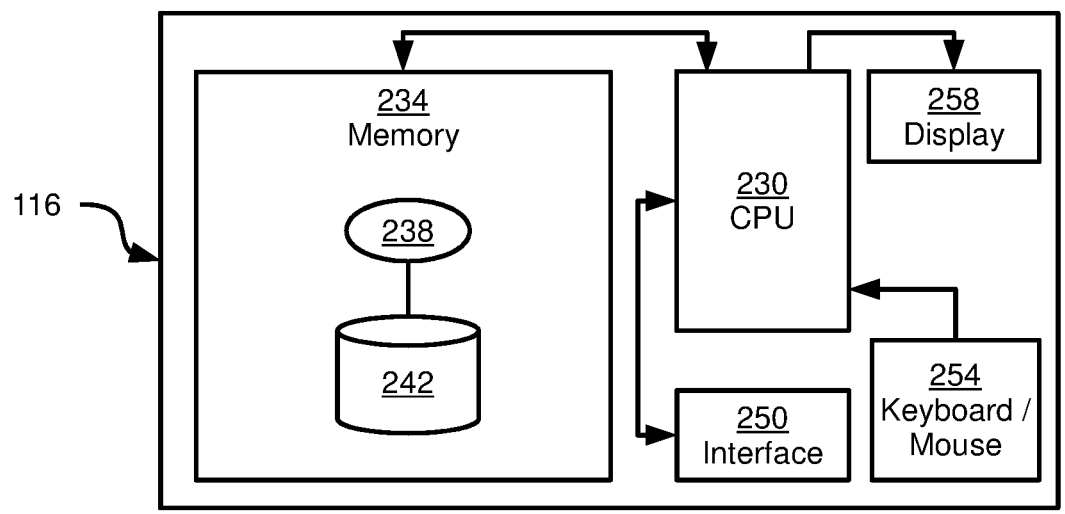
FIG. 2

Appl Microbiol Biotechnol (2011) 89:1275–1288
DOI 10.1007/s00253-010-3047-8

MINI-REVIEW ──── 600

Light requirements in microalgal photobioreactors: an overview of biophotonic aspects ──── 604

Ana P. Carvalho · Susana O. Silva · José M. Baptista ·
F. Xavier Malcata

Received: 21 September 2010 / Revised: 28 November 2010 / Accepted: 28 November 2010 / Published online: 23 December 2010
© Springer-Verlag 2010

Abstract In order to enhance microalgal growth in photobioreactors (PBRs), light requirement is one of the most important parameters to be addressed; light should indeed be provided at the appropriate intensity, duration, and wavelength. Excessive intensity may lead to photo-oxidation and -inhibition, whereas low light levels will become growth-limiting. The constraint of light saturation may be overcome via either of two approaches: increasing photosynthetic efficiency by genetic engineering, aimed at changing the chlorophyll antenna size; or increasing flux tolerance, via tailoring the photonic spectrum, coupled with its intensity and temporal characteristics. These approaches will allow an increased control over the illumination features, leading to maximization of microalgal biomass and metabolic productivity. This minireview briefly introduces the nature of light, and describes its harvesting and transformation by microalgae, as well as its metabolic effects under excessively low or high supply. Optimization of the photosynthetic efficiency is discussed under the two approaches referred to above; the selection of light sources, coupled with recent improvements in light handling by PBRs, are chronologically reviewed and critically compared.

Keywords Flashing light effect · Microalgae · Photosynthesis · Photobioreactor · Photo-inhibition · Photo-oxidation A. P. Carvalho · S. O. Silva
CBQF/Escola Superior de Biotecnologia,
Universidade Católica Portuguesa,
Rua Dr. António Bernardino de Almeida,
4200-072 Porto, Portugal S. O. Silva · J. M. Baptista
INESC Porto,
Rua do Campo Alegre 687,
4169-007 Porto, Portugal J. M. Baptista
Centro de Competência de Ciências Exactas e de Engenharia,
Universidade da Madeira,
Campus da Penteada,
9000-390 Funchal, Portugal F. X. Malcata
ISMAI–Instituto Superior da Maia,
Avenida Carlos Oliveira Campos, Castelo da Maia,
4475-690 Avioso S. Pedro, Portugal F. X. Malcata (✉)
Instituto de Tecnologia Química e Biológica,
Universidade Nova de Lisboa,
Avenida da República,
2780-157 Oeiras, Portugal
e-mail: fxmalcata@ismai.pt

Introduction

Microalgae are microorganisms characterized by a high productivity per unit area when compared with such other photosynthetic organisms as higher plants. This outstanding photosynthetic efficiency results from a reduced number of internally competitive physiological functions, fast reproduction cycles, limited nutrient requirements, and adaptation to a broad range of temporal and spectral irradiances (Gordon and Polle 2007). Furthermore, a few microalgal cultures (e.g., *Dunaliella*, *Spirulina*, and *Chlorella* spp.) are relatively prone to scale-up in photobioreactors (PBRs), where it is in principle possible to provide optimal nutrient levels on

FIG. 6

Appl Microbiol Biotechnol (2011) 89:1275-1288
DOI 10.1007/s00253-010-3047-8

MINI-REVIEW

Light requirements in microalgal photobioreactors:
an overview of biophotonic aspects Ana P. Carvalho & Susana O. Silva & José M. Baptista &
F. Xavier Malcata Received: 21 September 2010 / Revised: 28 November 2010 / Accepted: 28 November 2010 / Published online: 23 December 2010
Springer-Verlag 2010

Abstract In order to enhance microalgal growth in photobioreactors (PBRs), light requirement is one of the most important parameters to be addressed; light should indeed be provided at the appropriate intensity, duration, and wavelength. Excessive intensity may lead to photo-oxidation and -inhibition, whereas low light levels will become growth-limiting. The constraint of light saturation may be overcome via either of two approaches: increasing photosynthetic efficiency by genetic engineering, aimed at changing the chlorophyll antenna size; or increasing flux tolerance, via tailoring the photonic spectrum, coupled with its intensity and temporal characteristics. These approaches will allow an increased control over the illumination features, leading to maximization of microalgal biomass and metabolite productivity. This minireview briefly introduces the nature of light, and describes its harvesting and transformation by microalgae, as well as its metabolic effects under excessively low or high supply. Optimization of the photosynthetic efficiency is discussed under the two approaches referred to above; the selection of light sources, coupled with recent improvements in light handling by PBRs, are chronologically reviewed and critically compared.

Keywords Flashing light effect . Microalgae .
Photosynthesis Photobioreactor . Photo-inhibition .
Photo-oxidation A. P. Carvalho S. O. Silva
CBQF/Escola Superior de Biotecnologia,
Universidade Católica Portuguesa,
Rua Dr. António Bernardino de Almeida,
4200-072 Porto, Portugal S. O. Silva :
J. M. Baptista
INESC Porto,
Rua do Campo Alegre 687,
4169-007 Porto, Portugal J. M. Baptista
Centro de Competência de Ciências Exactas e de Engenharia,
Universidade da Madeira,
Campus da Penteada,
9000-390 Funchal, Portugal F. X. Malcata
ISMAI-Instituto Superior da Maia,
Avenida Carlos Oliveira Campos, Castelo da Maia, 4475-690 Avioso S. Pedro, Portugal F. X. Malcata (*)
Instituto de Tecnologia Química e Biológica,
Universidade Nova de Lisboa, Avenida da República,
2780-157 Oeiras, Portugal
e-mail: fmalcata@ismai.pt Introduction Microalgae are microorganisms characterized by a high productivity per unit area when compared with such other photosynthetic organisms as higher plants. This outstanding photosynthetic efficiency results from a reduced number of internally competitive physiological functions, fast reproduction cycles, limited nutrient requirements, and adaptation to a broad range of temporal and spectral irradiances (Gordon and Polle 2007). Furthermore, a few microalgal cultures (e.g., Dunaliella, Spirulina, and Chlorella spp.) are relatively prone to scale-up in photobioreactors (PBRs), where it is in principle possible to provide optimal nutrient levels on

FIG. 7 microbiology biotechnology minimum review light requirement
microalgae photobioreactor overview photonics aspect september
november november publishing online enhancement microalgae growth
photosynthesis efficiency genetic engineer photobioreactor light
requirement chlorophyll antenna size parameter light flux tolerance
photonics appropriate intensity duration spectrum coupling intensity
time wavelength intensity Pb approaching oxidation inhibition light
level control illumination growth limit constraint light microalgae
biomass metabolite approaching review introduction nature light
harvesting transformation microalgae metabolism effect supplying
optimization photosynthesis efficiency approaching selection light
source coupling improvement light handling chronology review critical
comparison portugal keyword flash light effect microalgae
photosynthesis photobioreactor inhibition oxidation campus portugal
introduction center microalgae microorganism characterization campus
productivity unit area comparison portugal photosynthesis organism
plant photosynthesis efficiency result reduction number internal
competition physiology function rapid reproduction cycle limit
nutrient portugal requirement adaptation range time spectrum
irradiance microalgae cultures nova dunaliella spirulina chlorella
scaling photobioreactor portugal mail optimization nutrient level

FIG. 8

904 900 916 908 912 microbiology biotechnology minimum review light requirement
microalgae photobioreactor overview photonics aspect september
november november publishing online enhancement microalgae growth
photosynthesis efficiency genetic engineer photobioreactor light
requirement chlorophyll antenna size parameter light flux tolerance
photonics appropriate intensity duration spectrum coupling intensity
time wavelength intensity Pb approaching oxidation inhibition light
level control illumination growth limit constraint light microalgae
biomass metabolite approaching review introduction nature light
harvesting transformation microalgae metabolism effect supplying
optimization photosynthesis efficiency approaching selection light
source coupling improvement light handling chronology review critical
comparison portugal keyword flash light effect microalgae
photosynthesis photobioreactor inhibition oxidation campus portugal
introduction center microalgae microorganism characterization campus
productivity unit area comparison portugal photosynthesis organism
plant photosynthesis efficiency result reduction number internal
competition physiology function rapid reproduction cycle limit
nutrient portugal requirement adaptation range time spectrum
irradiance microalgae cultures nova dunaliella spirulina chlorella
scaling photobioreactor portugal mail optimization nutrient level

STREAMLINING AND SEARCHING DOCUMENT TEXT

CROSS-REFERENCE TO RELATED APPLICATION

This application claims priority to U.S. provisional application No. 62/233,334, filed Nov. 9, 2015, the contents of which is incorporated herein by reference.

FIELD

The specification relates generally to document search, and specifically to a method, system and apparatus for processing and search documents.

BACKGROUND

Various search engines enable clients to find documents within databases of (sometimes pre-processed) documents. Such search engines receive various inputs for comparison to the database, such as keywords to be matched to words within the original document. Such keywords can be employed along with Boolean logical operators (e.g. AND, OR, NOT). Other inputs to conventional search engines include metadata, such as author names, publication dates and the like. Many such search engines are relatively simple to operate, but can produce lists of results that are very large and of minimal relevance, or very small (possibly of zero length).

Other known text analysis tools (e.g. APACHE LUCENE) provide greater flexibility and accuracy, but impose a greater computational load as they require that the full text of each document be indexed. In addition to the greater computational demands posed by such search engines, they typically require more complex inputs, and their use is therefore often restricted to experts.

SUMMARY

According to an aspect of the specification, a method is provided of processing a document for searching, comprising: obtaining, at a processor, document text from a memory connected to the processor; generating, at the processor, streamlined document text by: discarding a plurality of strings from the document text that match any of a plurality of preconfigured low-relevance strings to generate condensed document text; in the condensed document text, replacing a plurality of content strings with respective ones of a plurality of preconfigured content class identifiers; determining respective frequency values indicating the frequency of the content class identifiers in the streamlined document text; determining a proximity value for at least one pair of the content class identifiers in the streamlined document text; and storing a subset of the frequency values and the proximity value in the memory.

BRIEF DESCRIPTIONS OF THE DRAWINGS

Embodiments are described with reference to the following figures, in which:

FIG. 2 depicts certain internal components of the client device and document processing server of FIG. 1, according to a non-limiting embodiment;

FIG. 6 depicts an original document to be processed, according to a non-limiting embodiment;

FIG. 7 depicts document text generated from the document of FIG. 6, according to a non-limiting embodiment;

FIG. 8 depicts streamlined document text generated from the document text of FIG. 7, according to a non-limiting embodiment;

FIG. 9 depicts the streamlined document text of FIG. 8 with certain class identifiers highlighted, according to a non-limiting embodiment;

DETAILED DESCRIPTION OF THE EMBODIMENTS

Figure 1:
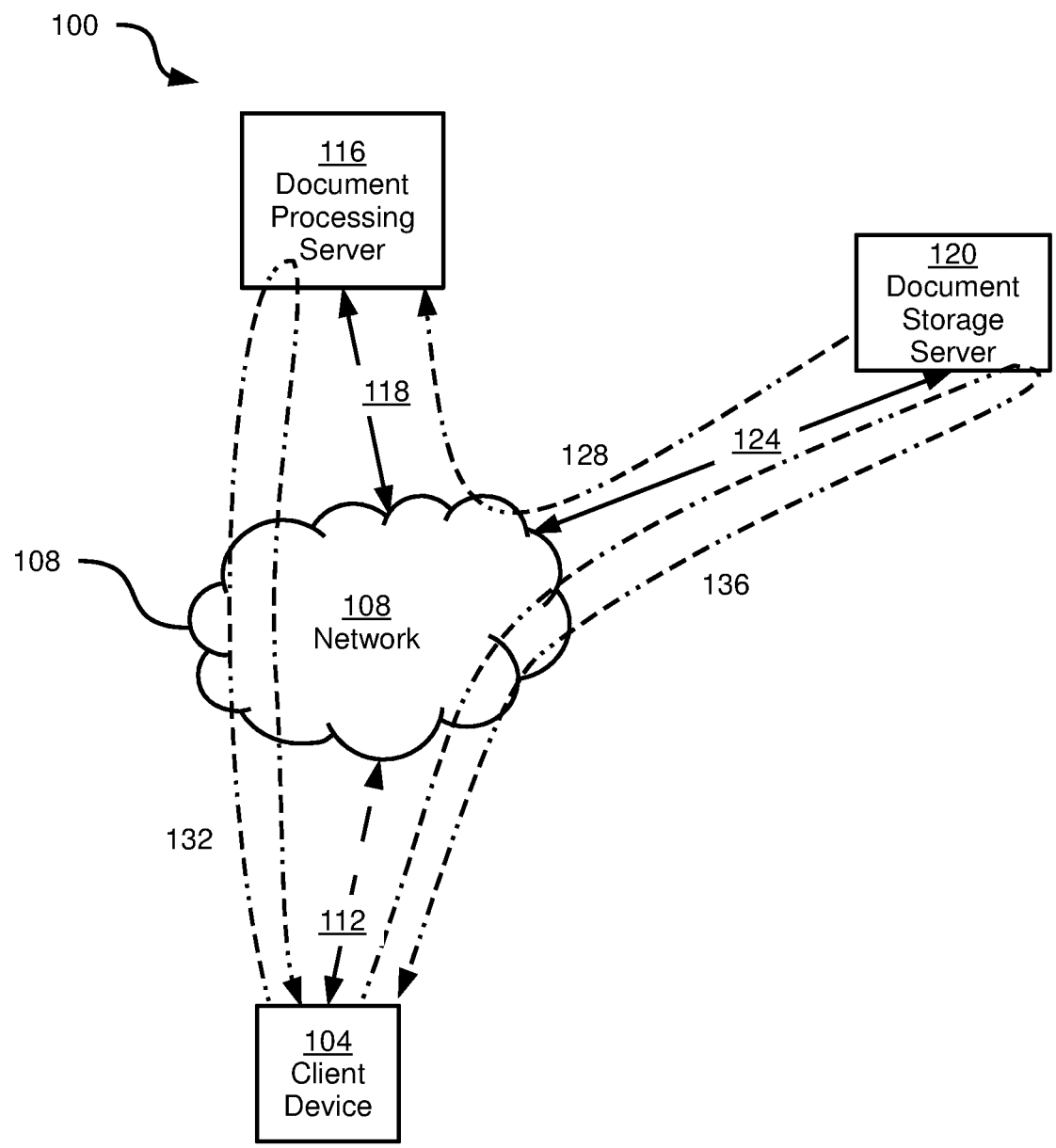
FIG. 1 depicts a system for processing and searching documents, according to a non-limiting embodiment.

FIG. 1 depicts a system 100 for processing and searching documents containing written content. System 100 includes a client computing device 104 (a plurality of client devices may be included, though a single client device 104 is illustrated for simplicity). Client device 104 can be any suitable computing device, including but not limited to a cellular phone, a smart phone, a tablet computer, a wearable device such as a smart watch or smart glasses, a desktop computer, a laptop computer, and the like.

Client device 104 is connected to a network 108 via a link 112, which is illustrated as a wireless link but can also be a wired link, or any suitable combination of wired and wireless links. Network 108 can include any suitable combination of wired and wireless networks, including but not limited to a Wide Area Network (WAN) such as the Internet, a Local Area Network (LAN) such as a corporate data network, WiFi networks and the like.

Via network 108, client device 104 can communicate with a document processing server 116, connected to network 108 via a link 118 (which is illustrated as a wired link, but can also be any suitable combination of wired and wireless links). Client device 104 and document processing server 116 can also each communicate with a document storage server 120 connected to network via a link 124 (which is illustrated as a wired link, but can also be any suitable combination of wired and wireless links).

In general, document storage server 120 stores a plurality of documents. Document processing server 116 is configured to obtain at least a subset of the documents stored by server 120 (e.g. via a path 128 illustrated in FIG. 1) and process each of the documents obtained to generate and store search data, to be described in detail herein. The generation of search data enables server 116 to receive and respond to search requests from client device 104, for example via the path 132 shown in FIG. 1. For example, server 116 can respond to a search request from client device 104 by comparing the search request to the above-mentioned search data, and returning to client device 104 one or more identifiers of relevant documents.

Having received indications of relevant documents from server 116, client device 104 can retrieve those documents from storage server 120, as illustrated by a path 136 in FIG. 1.

Although the operation of system 100, and particularly the operation of server 116, will be described herein with reference to the system architecture shown in FIG. 1, a variety of other system architectures can also be provided to implement the document searching activities described herein. For example, in some embodiments the storage, processing for searching, and generation of search requests can all be performed by a single computing device. An example of such an implementation is the deployment of the document processing and searching functionality described below in connection with a personal computer, in which the documents to be processed and searched reside on the personal computer itself, and in which the processing and search requests are generated and served locally.

In other example embodiments, document processing server 116 may also act as a document repository, replacing document storage server 120. In still other embodiments, a plurality of document storage servers can be connected to network 108 (e.g. each storing distinct collections of documents). In still further embodiments, the functionality of document processing server 116 can be implemented by a plurality of distinct computing devices. For example, a first computing device can perform the document processing (and generation of search data) discussed herein, while a second computing device can store the search data and handle client search requests.

Before discussing the operation of system 100 in detail, certain components of client computing device 104 and server 116 will be described with reference to FIG. 2.

Referring now to FIG. 2, client computing device 104 includes a central processing unit (CPU) 200, also referred to herein as processor 200, interconnected with a memory 204. Memory 204 stores computer readable instructions executable by processor 200, including a client search application 208. Processor 200 and memory 204 are generally comprised of one or more integrated circuits (ICs), and can have a variety of structures, as will now occur to those skilled in the art (for example, more than one CPU can be provided). Processor 200 executes the instructions of application 208 to perform, in conjunction with the other components of client computing device 104, various functions related to generating and transmitting search requests, and displaying the results of those search requests.

Client computing device 104 also includes input devices interconnected with processor 200, in the form of a keyboard and mouse 212. In some embodiments, keyboard and mouse 212 can be supplemented with, or replaced by, other input devices including any suitable combination of a touch screen, a camera, a microphone and the like (not shown).

Client computing device 104 also includes output devices interconnected with processor 200, including a display 216. Other output devices can also be provided, such as a speaker (not shown). Client computing device 104 also includes a network interface 220 interconnected with processor 200, which allows client computing device 104 to connect to network 108 via link 112. Network interface 220 thus includes the necessary hardware, such as radio transmitter/receiver units, network interface controllers and the like, to communicate over link 112.

Document processing server 116 includes a central processing unit (CPU) 230, also referred to herein as processor 230, interconnected with a memory 234. Memory 234 stores computer readable instructions executable by processor 230, including a document processing and searching application 238. Processor 230 and memory 234 are generally comprised of one or more integrated circuits (ICs), and can have a variety of structures, as will now occur to those skilled in the art (for example, more than one CPU can be provided).

Memory 234 also stores a repository 242 containing various data enabling the processing of documents for searching, as well as the retrieval of search results (i.e. documents) using the search data. The data can be stored according to a variety of suitable data structures, certain examples of which will be described herein.

Processor 230 executes the instructions of application 238 to perform, in conjunction with the other components of server 116 and employing the data in repository 242, various functions related to processing documents to generate the above-mentioned search data, and responding to search requests from client device 104 based on the search data. In the discussion below of those functions, server 116 is said to be configured to perform those functions—it will be understood that server 116 is so configured via the processing of the instructions in application 238 by the hardware components of server 116 (including processor 230 and memory 234).

Server 116 also includes a network interface 250 interconnected with processor 230, which allows server 116 to connect to network 108 via link 118. Network interface 250 thus includes the necessary hardware, such as network interface controllers and the like, to communicate over link 118. Server 116 also includes input devices interconnected with processor 230, such as a keyboard and mouse 254, as well as output devices interconnected with processor 230, such as a display 258. Other input and output devices (e.g. microphone, speakers and the like) can also be connected to processor 230. In some embodiments (not shown), keyboard and mouse 254 and display 258 can be connected to processor 230 via network 108 and another computing device. In other words, keyboard and mouse 254 and display 258 can be local (as shown in FIG. 2) or remote.

Figure 3:
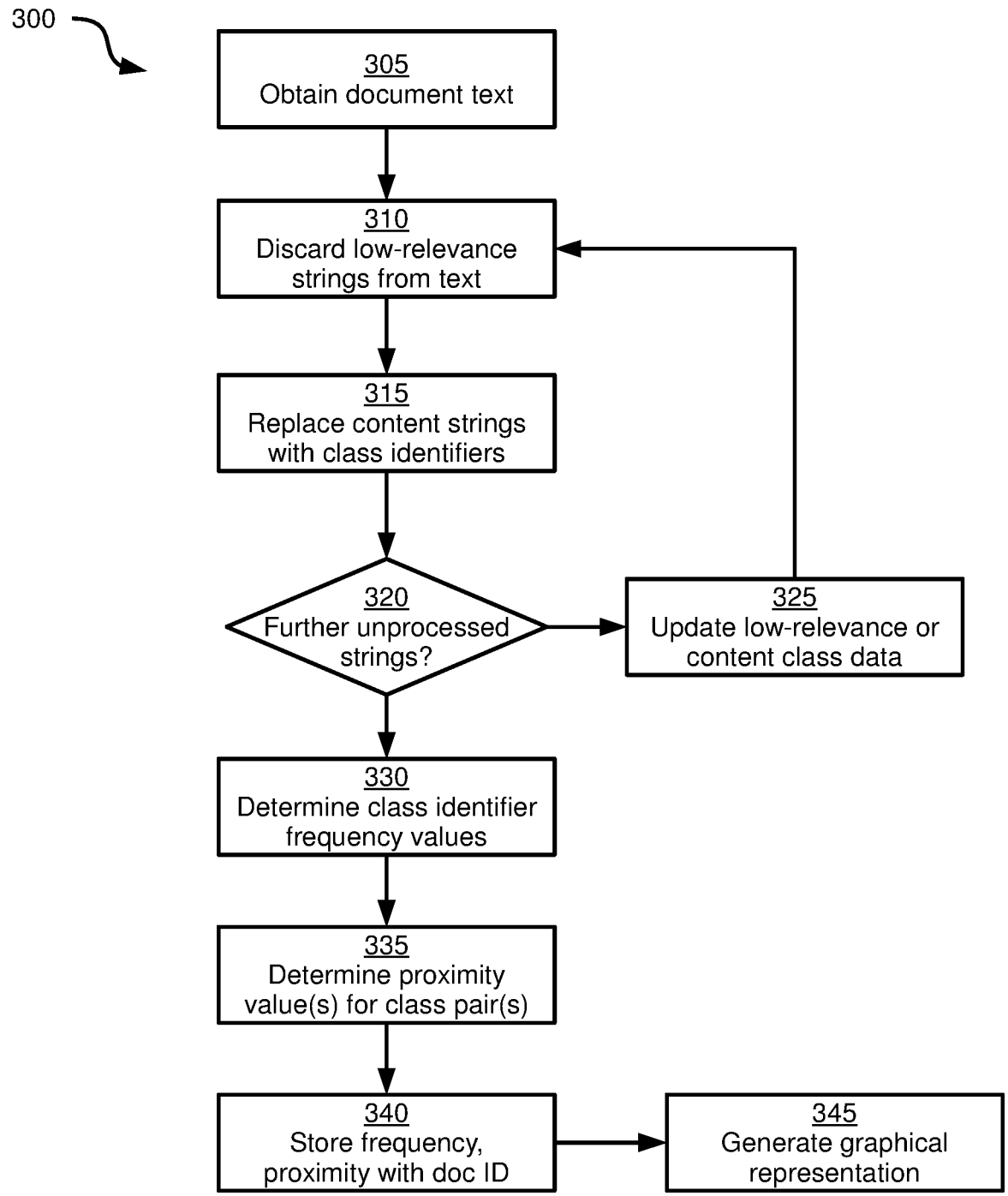
FIG. 3 depicts a method of processing documents for searching, according to a non-limiting embodiment.

Having described certain internal components of device 104 and server 116, the actions performed by those computing devices will be discussed in greater detail. Referring now to FIG. 3, a method 300 of processing a document for searching is illustrated. Method 300 will be described below in connection with its performance in system 100. Specifically, the blocks of method 300 are performed by server 116, via the execution of application 238 by processor 230.

At block 305, server 116 is configured to obtain document text representing a document to be processed for subsequent searching. As referred to herein, "document text" means computer-readable text, represented as any combination of digitally encoded characters (for example, encoded according to the ASCII standard, or any character encoding specified by the Unicode standard). More specifically, in a presently preferred embodiment, "document text" refers to plain text, which includes digitally encoded characters absent data (e.g. formatting tags and the like) specifying the visual representation of the text. The document text may be obtained, for example, in the form of a text (*.txt) file.

Server 116 can be configured to obtain document text in a variety of ways. In some embodiments, the original document does not contain document text, but instead contains images that depict text, such as in an image-based portable document format (PDF) file. In other embodiments, the original document contains formatted text, such as a Microsoft™ Word file. In such embodiments, the performance of block 305 includes retrieving the original document at server 116 (e.g. from server 120 via network 108 or from memory 234), and converting the original document into document text.

In the case of image data depicting text such as the above-mentioned PDF file, server 116 can implement any suitable known algorithm for extracting text data from images. For example, in some embodiments server 116 can transmit a request (e.g. an HTTP request, an email request, and the like, including the original document itself) to a third-party conversion service, such as Zamzar). Server 116 is then configured to receive the document text from the third party. In other embodiments, server 116 can implement a conversion algorithm locally (that is, processor 230 itself can generate the document text from the original document, for example via the implementation of any suitable optical character recognition (OCR) algorithm). When the original document, on the other hand, includes formatted text (e.g. a Microsoft™ Word document, as mentioned above), server 116 is configured to remove the formatting data, leaving only the text data. Alternatively, as in the case of image-based original documents, server 116 can be configured to transmit a request to a third party to remove formatting data and in response, receive the document text.

In the present embodiment, if the original document includes data that cannot be interpreted as text (e.g. an image that does not depict text decipherable via OCR, an audio file, and the like), server 116 is configured to discard such data. In other embodiments, to be discussed further below, server 116 can process such data alongside the text.

Having obtained the document text, processor 230 is configured to store the document text in memory 234 for further processing. Beginning at block 310, server 116 is configured to generate streamlined document text from the document text obtained at block 305. In brief, the generation of streamlined document text includes removing text deemed to have low relevance, and reducing variability in the text remaining once the low-relevance text has been removed.

More specifically, at block 310, server 116 is configured to identify a plurality of strings in the document text that match any of a plurality of preconfigured low-relevance strings. Server 116 is further configured to discard such strings from the document text (that is, to delete the identified strings from the document text, reducing the length of the document text). The nature of the preconfigured low-relevance strings is not particularly limited. In the present embodiment, the low-relevance strings can include both individual characters, such as characters denoting punctuation marks (e.g. commas, spaces, periods and the like), and combinations of characters, also referred to herein as words (in the sense that they represent words in a given language, such as English). As will be apparent, some words may also have only a single character (e.g. "a"), while some punctuation marks may be combined in a single low-relevance string (e.g. ".", a period followed by a space).

Figure 4A:
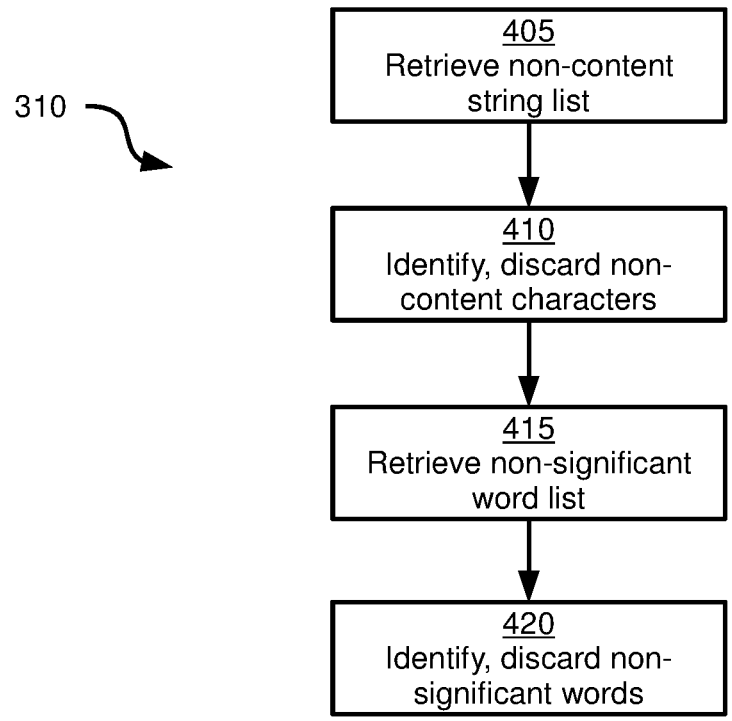
FIG. 4A depicts a method of performing block 310 of the method of FIG. 3, according to a non-limiting embodiment.

Turning to FIG. 4A, an example performance of block 310 is depicted. Beginning at block 405, server 116 is configured to retrieve a preconfigured list of non-content strings. The list, in the present example, is retrieved from memory 234. More specifically, repository 242 includes the list, in any suitable data structure (e.g. a flat file, a portion of a database, a distinct database containing only the non-content list, and so on). In other embodiments, the list can be retrieved from another computing device, for example via network 108.

Figures 5A, 5B:
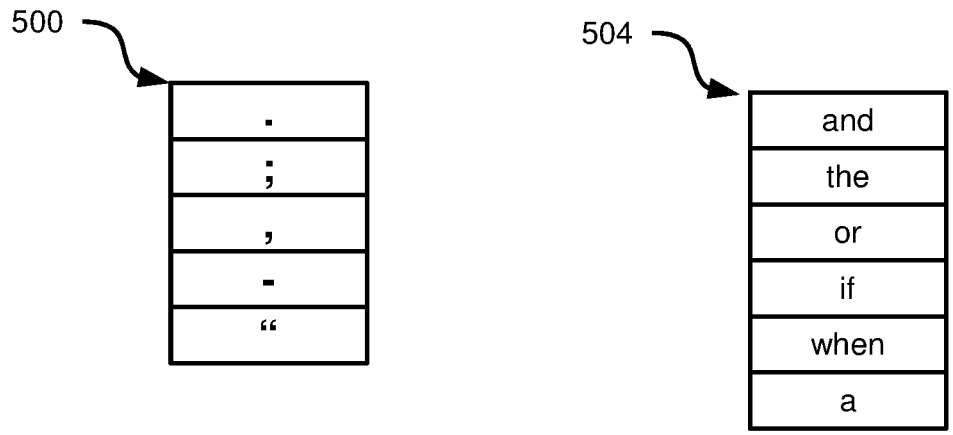
FIG. 5A depicts example low-relevance strings employed in the performance of the method of FIG. 3, according to a non-limiting embodiment.
FIG. 5B depicts example content class data employed in the performance of the method of FIG. 3, according to a non-limiting embodiment.

FIG. 5A depicts an example list 500 of non-content strings. List 500 includes a plurality of records (five records as illustrated), each record containing one non-content string. As seen in FIG. 5A, the non-content strings are punctuation marks (that is, characters that delimit and aid in the understanding of meaning conveyed by other text strings, rather than conveying meaning themselves). A wide variety of additional strings other than those shown in FIG. 5A may be represented in list 500.

At block 410, having retrieved the list of non-content strings, server 116 is configured to compare the document text to the non-content strings in the list. Each string in the document text that matches any of the non-content strings is discarded from the document text. Following the performance of block 410, therefore, the document text may appear as a continuous, unpunctuated block of text (depending, of course, on the completeness of list 500).

At block 415, server 116 is configured to retrieve a preconfigured list of non-significant strings. As with list 500, the list of non-significant strings can be retrieved from memory 234 (e.g. from repository 242, from a further flat file, and the like), or from a distinct computing device. The list of non-significant strings need not be retrieved from the same location as list 500.

FIG. 5B depicts an example list 504 of non-significant strings. List 504 includes a plurality of records (six records are illustrated), each record containing one non-significant string. As will now be apparent, the non-significant strings in the present embodiment include words such as conjunctions (e.g. "and", "but", "if" and so on), articles ("the", "a") and the like that serve to link other words in the document. In some embodiments, however, list 504 may also include other forms of non-significant strings, including nouns whose primary purpose is to convey meaning (e.g. "cat", "microbiology" and the like) rather than to link other words. Typically, however, non-significant strings do not convey specific meaning and include the above-mentioned liking words, certain adverbs (e.g. "however", "meanwhile"), and strings having no broadly accepted meaning (e.g. "kcdnf", "012389fe" and the like).

Although lists 500 and 504 are depicted separately in FIG. 5A and described above as being stored separately in memory 234, in some embodiments, list 500 and 504 can be combined. For example, non-content strings and non-significant strings can be stored in the same list (e.g. table, database structure or the like). In such embodiments, each record of the combined list preferably includes a type indicator, denoting whether the record contains a non-content string or a non-significant string. Although not mandatory, this is preferred because it permits the performance of block 410 to precede the performance of block 415, which enables a reduction in size of list 504. For example, words containing apostrophes (e.g. "cat's") need not be represented separately in list 504 from the plural of the same base word (e.g. "cats") to ensure the removal of both variants of non-significant word.

Returning to FIG. 3, as will now be apparent, the non-content strings and non-significant strings discussed above together form the low-relevance strings discarded at block 310. Stated more generally, low-relevance strings are strings that server 116 is preconfigured (e.g. via lists 500 and 504) to omit from the subsequent actions server 116 performs to generate search data. The generation of lists 500 and 504, or of any other suitable collections of low-relevance strings, can be performed in a variety of ways, examples of which will be discussed herein.

The modified version of the document text stored in memory 234 as a result of the performance of block 310 (e.g. blocks 405 to 420) is referred to as condensed document text (as it is condensed, or reduced in length, via the removal of low-relevance strings). In the present embodiment, in which the low-relevance strings include punctuation strings together corresponding to all punctuation present in the document text, the condensed document text is a continuous, unpunctuated block of text. The block contains a plurality of content strings, meaning words based on which search data is to be generated. In other words, the content strings define the topics or substance of the document (whereas the low-relevance strings do not).

Following the generation of the condensed document text at block 310, at block 315 server 116 is configured to replace a plurality of the above-mentioned content strings in the condensed document text with respective ones of a plurality of preconfigured content class identifiers. In general, the replacement of content strings with class identifiers at block 315 reduces the variability of the vocabulary in the condensed document text. That is, sets of related content strings (e.g. related words, such as "microbiology" and "microbial") are replaced with a single class identifier string.

Figure 4B:
FIG. 4B depicts a method of performing block 315 of the method of FIG. 3, according to a non-limiting embodiment.

Turning to FIG. 4B, an example performance of block 310 is depicted. Beginning at block 425, server 116 is configured to retrieve content class data, for example from memory 234. The content class data defines a plurality of sets of member content strings, each set having a corresponding class identifier. In general, each set contains a plurality of related words. The term "related" refers to words that are considered as equivalent for the purpose of search data generation. Typically, therefore, related words are indicative of the same topic, and more specifically may be synonymous, or be misspellings or truncations of a single word. Thus, related words may be synonyms, plural and singular versions of one another, conjugations of one another, and the like. Further, related words may be regional variations in spelling (e.g. "colour" and "color"), common misspellings (e.g. "recomendation"), and the like. In some cases, however, related words may be antonyms (e.g. "large" and "small") when the antonyms are considered related in that they both are indicative of the same topic (e.g. "size").

FIG. 5B illustrates an example set of member content strings as a list 508. As noted earlier in connection with lists 500 and 504, list 508 can be stored in any of a variety of data structures, including as a table, a flat file, a database (or indeed, a portion of the same database containing lists 500 and 504). List 508 includes a class identifier 512, and a plurality of member content strings 516. As seen from list 508, member content strings can include complete words (e.g. "nanograin"), partial words (e.g. "nanopartic"), and combinations of two or more words (e.g. "nanograinsized").

The nature and number of the member content strings of any given class is not particularly limited. Further, the number of sets of member content strings (i.e. the number of word classes) employed in the performance of method 300 is also not limited. Additional classes can be stored in separate data structures from list 508, or as separate sections in the same data structure. An example process for the generation of content class data will be described further below.

Returning to FIG. 4B, having retrieved the content class data at block 425, at block 430 server 116 is configured to identify at least one content string in the condensed document text that matches one of the member content strings in the content class data. In other words, server 116 is configured to determine that at least one of the content strings in the condensed document text matches one of the member content strings in the content class data.

Responsive to identifying a content string that matches a member content string, server 116 is configured to replace, in the condensed document text, the content string with the class identifier corresponding to the member content string. That is, server 116 deletes the content string and inserts in its place (i.e. in the same location in the condensed document text) the corresponding class identifier. In other embodiments, rather than replacing words in the condensed document text, server 116 can be configured to build a new file or block of text containing only the class identifiers, and subsequently discarding the condensed document text. This approach, however, may require that functions described below relating to the detection and remediation of gaps in the low-relevance and content class data be omitted.

The above steps are repeated until no further content strings in the condensed document text match member content strings in the content class data. As will now be apparent, it is preferable that the class identifiers do not match any content member strings (from any classes, including their own), as this may result in a class identifier being replaced with another class identifier, or being repeatedly replaced with itself. In some embodiments, however, server 116 can be configured to ignore any content strings that match class identifiers. Processor 230 can be configured to search the condensed document text for content strings matching member content strings from the content class data according to any suitable known searching algorithm or combination thereof.

Server 116 is configured to detect when no further replacements of content strings in the condensed document text are possible, and in response to advance to block 320 of method 300. At block 320, server 116 is configured to determine whether the post-replacement condensed document text contains any strings that do not match class identifiers.

The condensed document text, even after replacement at block 315, may initially contain strings (including individual characters, sets of characters, or both) that do not appear in the low-relevance data (e.g. lists 500 and 504) or the content class data (e.g. list 508). Such strings have therefore neither been removed as low-relevance or replaced with class identifiers following the conclusion of block 315. These strings are referred to herein as unprocessed strings. Through the above-mentioned identification of strings that do not match content class identifiers, server 116 is configured to detect such unprocessed strings and initiate an iterative process at blocks 320 and 325 to yield the final streamlined document text.

When the determination at block 320 is affirmative, server 116 is configured to proceed to block 325, at which one or more of the low-relevance data and the content class data are updated. In particular, server 116 is configured to present all unprocessed strings identified at block 320, for example on display 258. Responsive to presenting the unprocessed strings on display 258, server 116 is configured to receive input data (e.g. via keyboard and mouse 254). The input data contains, for at least one unprocessed string—and preferably for every unprocessed string—an indication of whether the unprocessed string is low-relevance data or content class data. More specifically, the input data for each unprocessed string can include a selection of one of list 500, list 504, and a content class (e.g. a selection of a content class identifier).

That is, an operator of server 116 can, responsive to the unprocessed strings being presented on display 258, select whether to place each unprocessed string in list 500, list 504, or list 508 (or any other available content class).

Server 116 is configured to update the low-relevance data and content class data stored in memory 234 based on the input data received at block 325, and to then return to block 310. The performance of blocks 310, 315 and 320 are repeated based on the updated low-relevance data and content class data. When the determination at block 320 is negative, server 116 proceeds to block 330. It will now be apparent that following a negative determination at block 320, the generation of streamlined document text—that is, the original document text having had both low-relevance strings removed and all remaining strings replaced with content class identifiers—is complete.

Before a discussion of the remainder of method 300, illustrations of various stages of the document processing described above are provided. Referring to FIG. 6, a partial example of a document to be processed for searching is depicted. In particular, the document shown is the first page of the paper, "Light requirements in microalgal photobioreactors: an overview of biophotonic aspects" (Carvalho, A. P., Silva, S. O., Baptista, J. M., Malcata, F. X.; *Appl Microbiol Biotechnol* (2011) 89:1275-1288; © Springer-Verlag). As seen in FIG. 6, the original document includes graphical elements such as the shaded background element 600, as well as text formatting, such as the large, bolded title 604. In additional the document may be stored digitally in an image format (e.g. an image-based PDF) rather than as digitally-represented text.

Turning to FIG. 7, the results of the performance of block 305 are illustrated. More specifically, FIG. 7 depicts the document text obtained from the first page illustrated in FIG. 6, by way of character recognition (in the case of an image-based document) and discarding of image data and formatting data. Thus, FIG. 7 depicts the document in plain, unformatted text (as seen, for example by inspecting the string "MINI-REVIEW" and the title in comparison to those in FIG. 6).

Referring next to FIG. 8, streamlined document text is depicted, as generated from the document text of FIG. 7 via the performance of blocks 310 and 315. As is evident from FIG. 8, punctuation marks appearing in the original text have been deleted (although space characters appear in the streamlined text, as will be discussed below). Additionally, the total word count of the text has been reduced from about 430 words to about 140 words (spanning about 90 unique words), as a result of server 116 discarding low-relevance strings. For example, the first three lines of the original document shown in FIG. 6 include the journal name ("Appl Microbiol Biotechnol"), identifying numerical strings (issue and page numbers, and the DOI identifier), and the string "MINI-REVIEW". Returning to FIG. 8, it can be seen that the "Appl" portion of the journal title and the numerical strings have been discarded. That is, the string "Appl" appears in the low-relevance data mentioned earlier, as do the digits (either as single digits, e.g. "2," "0" and so on or full numerical strings, e.g. "2011") and punctuation marks.

Of the remaining portions of the three lines mentioned above, the string "microbiol" has been replaced with the class identifier "microbiology", the string "biotechnol" has been replaced with the class identifier "biotechnology", and the string "mini-review" has been replaced with the class identifiers "minimum" and "review". Further inspection of the text as shown in FIGS. 6 and 8 reveals that a variety of other strings have been discarded, and further strings have been replaced. For example, the words "limiting" and "limited" in the original text have each been replaced with the class identifier "limit" (which therefore appears twice in the streamlined text), thus reducing variability in the streamlined document's vocabulary (i.e. the number of distinct words in the text). As further examples, the words "the" and "are", which appeared in numerous locations in the original text, has been removed entirely.

As will now be apparent, space characters have been inserted between the class identifiers in the streamlined text of FIG. 8 (e.g. at block 315, each relevant content string is replaced with a class identifier, followed by a space). In other embodiments, the space characters can be omitted. In the present embodiment, the space characters are employed to enable processor 230 to more efficiently detect delimitations between adjacent class identifiers (without needing to consult the content class data, for instance).

As will also now be apparent to those skilled in the art by a comparison of FIGS. 7 and 8, in generating streamlined text via the performance of blocks 310 and 315, processor 230 is configured to traverse the document text from left to right and top to bottom, without accounting for column divisions or other layout-related formatting characters. Thus, when generating the condensed document text from the text shown in FIG. 7, the top lines of the left and right columns are condensed into a single continuous line, thus bringing words (i.e. " . . . growth in" and "increasing photosynthetic . . . " into closer proximity than intended in the original document. In some embodiments, this approach is preferred because it is computationally less costly. In other embodiments, however, it is preferred that processor 230 be configured to detect layout features in a document, such as groups of space or tab characters that are indicative of a division between columns of text, and re-arrange the document text prior to the performance of block 310 in order to preserve the sequence of the text in the original document (e.g. left to right, top to bottom for left column, followed by left to right, top to bottom for right column).

Returning to FIG. 3, following the generation of the streamlined document text and any necessary updating of the low-relevance data and content class data, at block 330 server 116 is configured to determine respective frequency values for each of the content class identifiers that appear in the streamlined document text. Each frequency value represents how frequently a given class identifier appears in the streamlined document text, relative to the length of the streamlined document text.

In the present embodiment, each frequency value is determined by server 116 by determining a count of a given class identifier in the streamlined document text, and normalizing the count with respect to the total number of class identifiers in the document text. For example, the class identifier "light" appears 9 times in the streamlined text shown in FIG. 8, and the streamlined text has a total length of 144 words (that is, 144 class identifiers). The frequency of the class identifier "light" is therefore given by 9/144, or 0.0625. The frequency may be expressed in any of a variety of ways. For example, expressed as a percentage, the class identifier light has a frequency of 6.25%. The same determination is repeated by server 116 for each unique class identifier that appears in the streamlined document text.

Table 1, below, illustrates the frequencies (in percentages) of the class identifiers contained in the streamlined document text shown in FIG. 8. The frequencies were obtained by dividing the number of occurrences of each class identifier in the streamlined document text shown in FIG. 8 by the total number of class identifiers in the streamlined document text.

TABLE 1

Frequencies of Class Identifiers

| Class ID | Freq. (%) |
| --- | --- |
| light | 6.25 |
| microalgae | 4.86 |
| portugal | 3.47 |
| photosynthesis | 3.47 |
| photobioreactor | 2.78 |
| approaching | 2.08 |
| intensity | 2.08 |
| efficiency | 2.08 |
| requirement | 2.08 |
| review | 2.08 |
| campus | 1.39 |
| comparison | 1.39 |
| coupling | 1.39 |
| effect | 1.39 |
| growth | 1.39 |
| inhibition | 1.39 |
| introduction | 1.39 |
| level | 1.39 |
| limit | 1.39 |
| november | 1.39 |
| nutrient | 1.39 |
| optimization | 1.39 |
| oxidation | 1.39 |
| photonics | 1.39 |
| spectrum | 1.39 |
| time | 1.39 |
| adaptation | 0.69 |
| antenna | 0.69 |
| appropriate | 0.69 |
| area | 0.69 |
| aspect | 0.69 |
| biomass | 0.69 |
| biotechnology | 0.69 |
| center | 0.69 |
| characterization | 0.69 |
| *chlorella* | 0.69 |
| chlorophyll | 0.69 |
| chronology | 0.69 |
| competition | 0.69 |
| constraint | 0.69 |
| control | 0.69 |
| critical | 0.69 |
| cultures | 0.69 |
| cycle | 0.69 |
| *dunaliella* | 0.69 |
| duration | 0.69 |
| engineer | 0.69 |
| enhancement | 0.69 |
| flash | 0.69 |
| flux | 0.69 |
| function | 0.69 |
| genetic | 0.69 |
| handling | 0.69 |
| harvesting | 0.69 |
| illumination | 0.69 |
| improvement | 0.69 |
| internal | 0.69 |
| irradiance | 0.69 |
| keyword | 0.69 |
| mail | 0.69 |
| metabolism | 0.69 |
| metabolite | 0.69 |
| microbiology | 0.69 |
| microorganism | 0.69 |
| minimum | 0.69 |
| nature | 0.69 |
| nova | 0.69 |
| number | 0.69 |
| online | 0.69 |
| organism | 0.69 |
| overview | 0.69 |

TABLE 1-continued

Frequencies of Class Identifiers

| Class ID | Freq. (%) |
| --- | --- |
| parameter | 0.69 |
| Pb | 0.69 |
| physiology | 0.69 |
| plant | 0.69 |
| productivity | 0.69 |
| publishing | 0.69 |
| range | 0.69 |
| rapid | 0.69 |
| reduction | 0.69 |
| reproduction | 0.69 |
| result | 0.69 |
| scaling | 0.69 |
| selection | 0.69 |
| september | 0.69 |
| size | 0.69 |
| source | 0.69 |
| *spirulina* | 0.69 |
| supplying | 0.69 |
| tolerance | 0.69 |
| transformation | 0.69 |
| unit | 0.69 |
| wavelength | 0.69 |
| minimum | 0.69 |
| nature | 0.69 |
| nova | 0.69 |

At block 335, following the determination of frequency values for each class identifier in the streamlined document text, server 116 is configured to determine a proximity value for at least one pair of the class identifiers in the streamlined document text. The proximity value indicates the distance, typically in terms of the number of other class identifiers, between two class identifiers in the streamlined document text.

To determine the proximity value, server 116 is first configured to select a pair of class identifiers appearing in the streamlined document text. In some embodiments, server 116 is configured to generate every possible pair (e.g. every permutation of two class identifiers) from all the class identifiers in the streamlined document text. In the present embodiment, however, server 116 is instead configured to identify a subset of the class identifiers based on the frequency values determined at block 330, and to generate permutations from that subset, rather than from the entire range of class identifiers in the streamlined text.

The subset identified by server 116 can be defined in a variety of ways. In the present embodiment, server 116 is configured to select a configurable number of the most frequently appearing class identifiers. For example, memory 234 stores a configurable number, and processor 230 retrieves that number from memory and select that number of the most frequently appearing class identifiers. For the purpose of illustration, that number will be assumed to be 10 in the present example performance of method 300. Therefore, processor 230 selects the ten most frequently appearing class identifiers in the streamlined document text. Referring to Table 1, the ten most frequently appearing class identifiers are those having frequencies of 2.08% or higher.

Other processes are contemplated for identifying a subset of class identifiers. The preconfigured number above may not always coincide with a decrease in frequency; for example, if the preconfigured number mentioned above were 15 instead of 10, some class identifiers with a frequency of 1.39% would be selected while others with the same frequency would be omitted. This may not be desirable. Therefore, in other embodiments processor 230 is configured to adjust the preconfigured number upwards or downwards to coincide with the nearest step in class identifier frequency. In further embodiments, the preconfigured number is replaced with a preconfigured frequency threshold, such that processor 230 is configured to select all class identifiers having frequencies above that threshold, regardless of how many class identifiers the resulting subset contains. In other words, it is contemplated that the population of the subset need not be the same for every document processed.

Having selected a subset of the available class identifiers, server 116 is configured to generate at least one pair of class identifiers from the subset. In the present embodiment, server 116 is configured to generate every possible two-member permutation from the subset. Therefore, in the event that the subset contained only two class identifiers, "A" and "B", two pairs would be generated by processor 230: [A, B] and [B, A]. For the present example performance of method 300, the number of permutations generated from the 10 most frequent class identifiers is 90.

Each pair generated according to the mechanism set out above has a first member and a second member. Processor 230 is then configured to locate the first instance of the first member in the streamlined text (starting from the first class identifier) and the instance of the second member closest to the first instance of the first member. The term "closest" refers to the smallest separation either in the direction of reading (e.g. left to right, top to bottom) or, as noted below, in the reverse of the direction of reading (e.g. right to left, bottom to top). For example, turning to FIG. 9, for the pair [light, microalgae], processor 230 is configured to locate a first instance 900 of "light" in the streamlined text, and to then locate the closest instance of "microalgae" to instance 900. The closest instance of "microalgae" is indicated at 904.

Processor 230 is configured to determine the number of class identifiers (i.e. the distance) between the two located instances. In the present example, there is only one class identifier between instances 900 and 904, and the distance is therefore represented as "2" in the present embodiment (i.e. the instance 904 of "microalgae" is the second string from instance 900 of "light"). The distance need not be represented as such, however—in other embodiments, the distance is counted as only the number of intervening strings (i.e. 1, in the current example). Processor 230 is then configured to repeat the above location of instances and determination of distance until every instance of the first member has been located and processed. In the present example, the second instance of "light" is indicated at 908. The next instance of "microalgae" in the direction of reading is indicated at 912, but that is not the closest instance to 908. Instead, instance 916 of "microalgae" is the closest, at a distance of 7 class identifiers (i.e. six class identifiers in between instances 908 and 916). In other words, the location of the closest instance of the second pair member need not be located in the direction of reading relative to the first member—it can also be located in the reverse of the direction of reading.

Processor 230 is configured, having located each instance of the first member, located the closest instances of the second member, and determined the distances therebetween, to generate a single proximity value from the distances determined. In the present embodiment, processor 230 is configured to calculate the mathematical median of all determined distances for the relevant pair. Other proximity values may be employed instead, such as the mathematical average of the determined distances, and the like.

Processor 230 is configured to repeat the above distance-measuring process for every pair of class identifiers that was generated. At block 340, processor 230 is configured to store at least a subset of the frequency values, as well as the proximity values. For example, in the present embodiment processor 230 is configured to store the values in memory 234, in association with an identifier of the document being processed.

Various data structures are contemplated for the storage of frequency and proximity values. For example, the frequency and proximity values may be stored in a matrix, as shown below in Table 2. Other data structures than the matrix exemplified in Table 2 can also be employed to store the frequency and proximity values. For example, the values can be stored in flat files, database tables, and the like.

TABLE 2

Stored Frequency and Proximity Values

| | 1 | 2 | 3 | 4 | 5 | 6 | 7 | 8 | 9 | 10 |
|---|---|---|---|---|---|---|---|---|---|---|
| 1 | 62.5 | 7 | 30 | 8 | 13 | 6 | 20 | 10 | 29 | 6 |
| 2 | 3 | 48.6 | 19 | 8 | 7 | 26 | 29 | 14 | 27 | 8 |
| 3 | 19 | 7 | 34.7 | 6 | 7 | 34 | 64 | 13 | 19 | 25 |
| 4 | 5 | 5 | 5 | 34.7 | 16 | 25 | 48 | 1 | 18 | 16 |
| 5 | 4 | 6 | 61 | 12 | 27.8 | 37 | 49 | 20 | 13 | 20 |
| 6 | 3 | 7 | 26 | 12 | 21 | 20.8 | 16 | 13 | 33 | 9 |
| 7 | 5 | 16 | 45 | 20 | 16 | 5 | 20.8 | 19 | 14 | 20 |
| 8 | 4 | 6 | 13 | 1 | 20 | 24 | 29 | 20.8 | 14 | 17 |
| 9 | 1 | 6 | 59 | 14 | 2 | 39 | 30 | 14 | 20.8 | 22 |
| 10 | 3 | 4 | 25 | 11 | 10 | 9 | 32 | 12 | 34 | 20.8 |

The column and row headers in Table 2 correspond to the ten most frequently appearing class identifiers in the streamlined document text shown in FIG. 8. Thus, "1" refers to "light", "2" refers to "microalgae" and so on. The column and row headers need not contain numbers, but can instead contain the corresponding class identifiers. In embodiments where the above numbers are employed (or indeed any other strings that are not the class identifiers), memory 234 can also store a set of records indicating which header string corresponds to which class identifier (effectively, a header-class identifier dictionary).

The trace coefficients in the above matrix (that is, the values stored in the diagonal running from cell (1, 1) to cell (10, 10)) correspond to the frequency values for the ten most frequent class identifiers from Table 1. The frequency values have been scaled up by a factor of ten from Table 1, but in other embodiments the same values may be employed (without scaling) as those in Table 1. The non-trace coefficients, meanwhile, are the proximity values. Thus, the cell in the first row and second column (having a value of "7") is the proximity value for the pair [light, microalgae]. To illustrate the origin of the proximity value for the pair [light, microalgae], in the streamlined text of FIG. 9 the respective distances for each closest pair of "light" and "microalgae" are [2, 7, 13, 8, 1, 3, 9, 11, 2], of which the median is 7.

As will now be apparent, the above-mentioned subset of frequency values that are stored includes the frequency values for the class identifiers for whom proximity values have been determined. The frequency values for the remaining class identifiers are discarded in the present embodiment. In other embodiments, however, the frequency values for class identifiers not used in the determination of proximity values can be stored (e.g. separately from the matrix shown above).

The frequency and proximity values are stored (e.g. in a matrix as in Table 2) in association with a document identifier. The nature of the document identifier is not particularly limited. For example, the document identifier can be a standardized identifier such as a DOI number. In other embodiments, the document identifier can include a URL identifying the storage location of the original document (e.g. at server 120). The document identifier can also include document metadata such as a journal name, author names, publication dates and the like. The association between the frequency and proximity values and the document identifier can be established by way of an index file or database stored in memory 234. For example, the index file can contain a record for each document, the record including a storage location, identifier or the like, of the matrix and the document identifier. In the present embodiment, the above matrix is stored in a single flat file along with the document identifier, which includes not only a URL but also the streamlined text itself. A wide variety of other storage structures are also contemplated, however.

In addition to the frequency and proximity values, server 116 can also be configured to store the raw count values determined earlier for each class identifier (that is, the number of times each class identifier appears in the streamlined text, prior to normalization relative to the length of the streamlined text). As with the frequency values, server 116 is configured to store only those count values corresponding to the selected subset of most-frequently appearing class identifiers.

Returning to FIG. 3, when the frequency and proximity values have been stored in memory 234, the processing of the document for searching is complete. That is, server 116 is enabled to provide the document (or simply information identifying the document) in response to search requests. The handling of search requests will be described below. Before discussing the handling of search requests, however, an additional, optional block of method 300 will be described.

At block 345, in the present embodiment server 116 is configured to generate a graphical representation of the frequency and proximity values determined and stored at blocks 330-340. The performance of block 345 can be omitted in other embodiments. In still further embodiments, block 345 can be performed, but only in response to search requests.

Continuing with the present embodiment, server 116 is configured to generate the graphical representation by retrieving the frequency and proximity values stored at block 340. Server 116 is then configured to generate a graphical element corresponding to each frequency value and a graphical element corresponding to each proximity value. In the present embodiment, the frequency graphical element is a two-dimensional shape, such as an ellipse or a polygon, and the proximity graphical element is a line connecting two frequency graphical elements.

Figure 10:
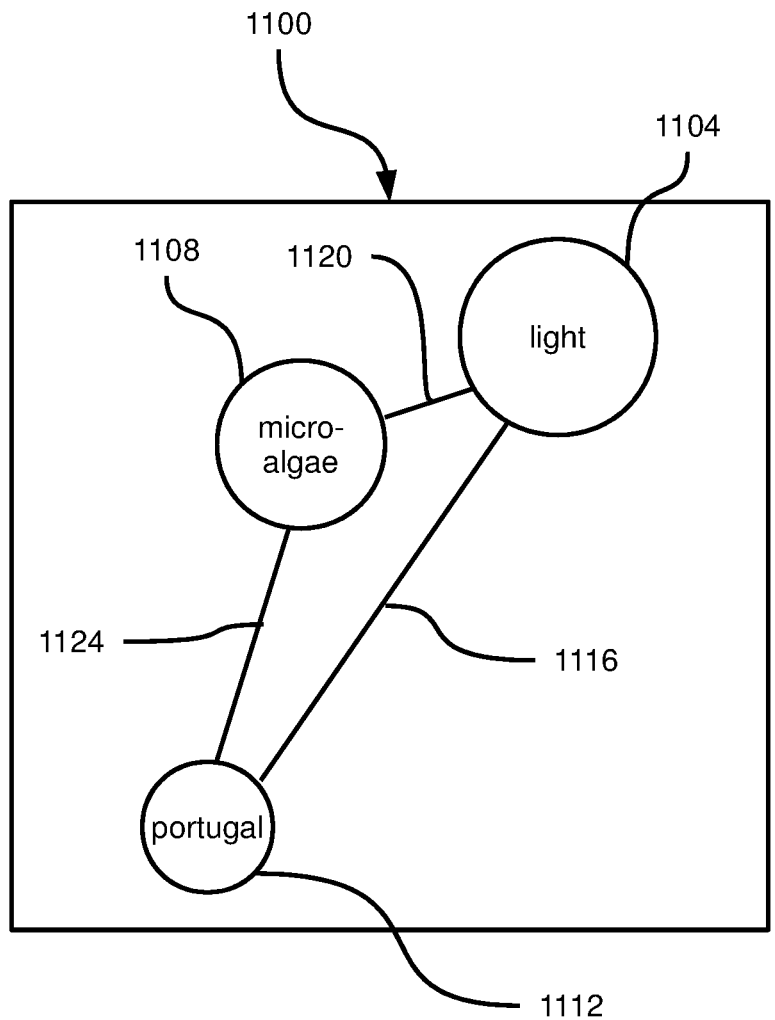
FIG. 10 depicts a graphical representation of the search data generated from the performance of the method of FIG. 3, according to a non-limiting embodiment.

Referring to FIG. 10, an example graphical representation 1100 of a subset of the data shown in Table 2 is depicted. In particular, the three most frequent class identifiers ("light", "microalgae" and "portugal") are depicted as ellipses (specifically, circles) 1104, 1108 and 1112. Circles 1104, 1108 and 1112 are connected by lines 1116, 1120 and 1124. As will now be apparent, each circle (that is, each frequency graphical element) has a size that is based on the frequency value determined for the corresponding class identifier. For example, the diameter of the graphical elements may be proportional to frequency. In other embodiments, the area of the polygon may be proportional to frequency, rather than the diameter or other linear measurements.

Proximity graphical elements may have lengths proportional to the corresponding proximity values. It will be noted, however, that in FIG. 10 each pair of frequency elements is connected by a single proximity element rather than two, Each set of two class identifiers, as seen in Table 2, has two proximity values, since proximity values are directional (that is, the pair light-microalgae has a different proximity value than the pair microalgae-light). Server 116, in the present embodiment, is configured to determine the average of the two "directions" of proximity values for a given set of two class identifiers. The length of the proximity graphical element connecting the corresponding frequency graphical elements is computed based on that average.

It will also be noted that particularly as the number of frequency graphical elements increases, solutions for the lengths of the lines (i.e. the proximity graphical elements) that are directly proportional to the above-mentioned proximity averages may not exist. Server 116 is therefore configured to implement an algorithm to determine two-dimensional positions within the image representation for the frequency elements, and to thereby determine lengths for the proximity elements. For example, the algorithm can be defined by a Lennard Jones potential model, or any variation thereof. The lengths so determined are not necessarily directly proportional to the proximity averages mentioned above.

More specifically, server 116 is configured to generate the frequency elements (with areas or other parameters proportional to corresponding frequency values) and to simulate a plurality of repulsive or attractive fields acting on the frequency elements. In the present embodiment, the fields applied by server 116 include a common repulsive field applied to all frequency elements, to push the frequency elements towards outer edges of the image area. The fields also include an attractive field acting on each pair of frequency elements, with a strength inversely proportional to the average proximity value for that pair of elements (that is, the larger the proximity value, indicating a greater "distance" between the corresponding class identifiers, the weaker the attractive field).

Further, the fields simulated by server 116 include a short-range repulsive field emitted by each frequency element and acting on any adjacent elements, to prevent frequency elements from being located directly on top of each other under the influence of the above-mentioned attractive fields. Server 116 is configured to simulate movement of the frequency elements under the effects of the above fields, until an equilibrium is reached in the simulation (i.e. the movement of each frequency element within the image area has substantially ceased). The image representation defines the position of each frequency element when equilibrium has been reached, and therefore also defines the position and length of each proximity element.

The image representation may be stored in any suitable format in association with the above-mentioned document identifier. For example, the representation may be stored in a raster format (e.g. portable network graphic, PNG), or a vector format (e.g. containing center coordinates and diameters or other parameters for the frequency elements, as well as endpoint coordinates for the proximity elements).

Figure 11:
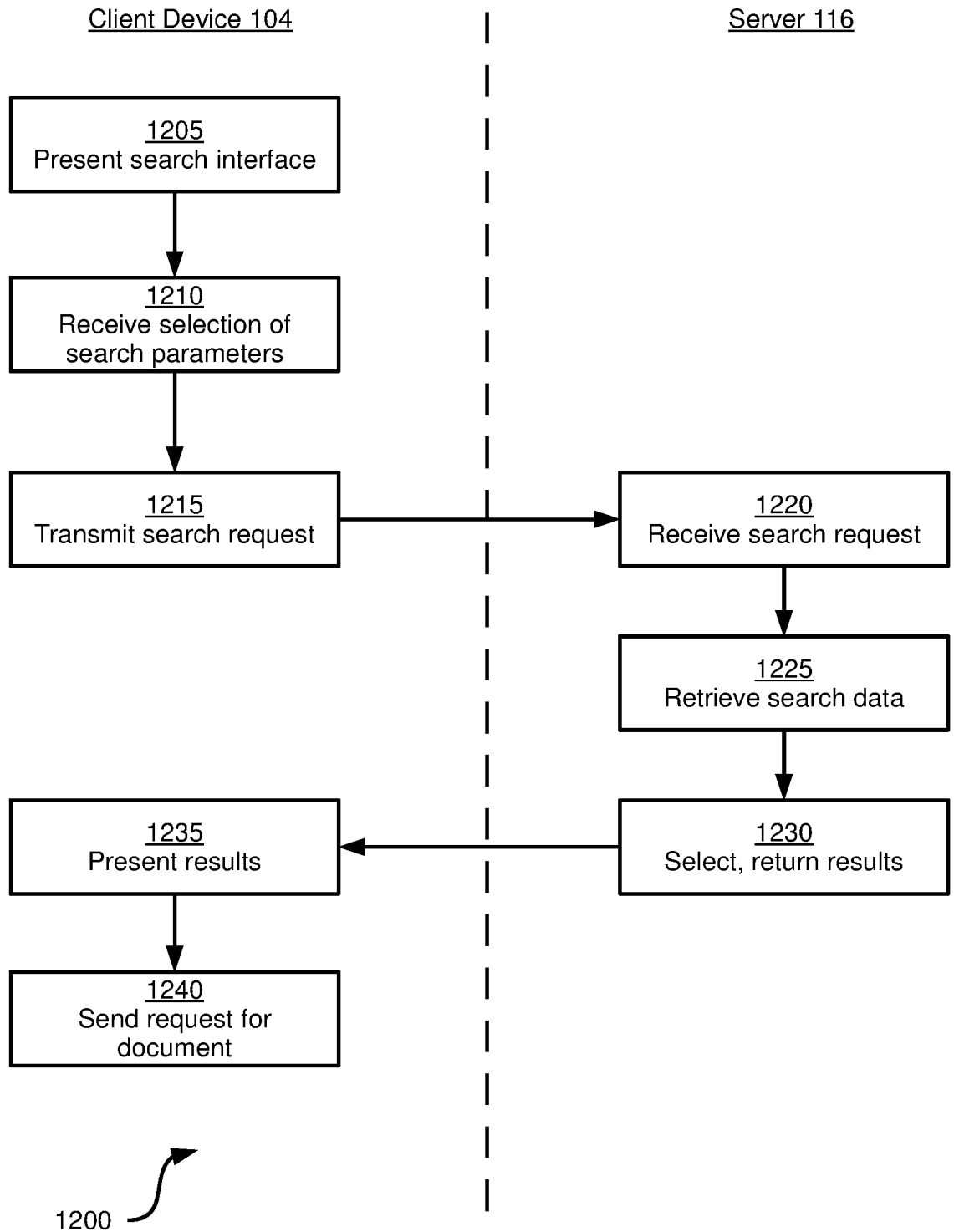
FIG. 11 depicts a method for searching documents in the system of FIG. 1, according to a non-limiting embodiment.

Referring now to FIG. 11, a method 1200 of searching documents is illustrated. Method 1200 will be described below in connection with its performance in system 100. Specifically, certain blocks of method 1200 are performed by server 116 (which may also be referred to as a method for responding to document search requests), via the execution of application 238 by processor 230. Other blocks of method 1200 are performed by client device 104, via the execution of client application 208.

At block 1205, client device 104 is configured to present a search interface on display 216. In the present embodiment, the search interface is defined within the compute-readable instructions of application 208. In other embodiments, however, the presentation of a search interface may implemented by client device 104 by way of requesting (e.g. via an HTTP request) a search interface from server 116. In other words, in some embodiments client application 208 can be a conventional web browser, and search interfaces can be served to client device 104 by server 116.

Client device 104 is configured to present a search interface based on a selection received at processor 200 from keyboard and mouse 212 (or any other suitable input device) of a type of search to be performed. In the present embodiment, three search types may be selected from. In other embodiments, however, greater or smaller numbers of search types may be provided. For example, in some embodiments only a single search type may be provided, and in such embodiments the selection of a search type is omitted.

Figure 12:
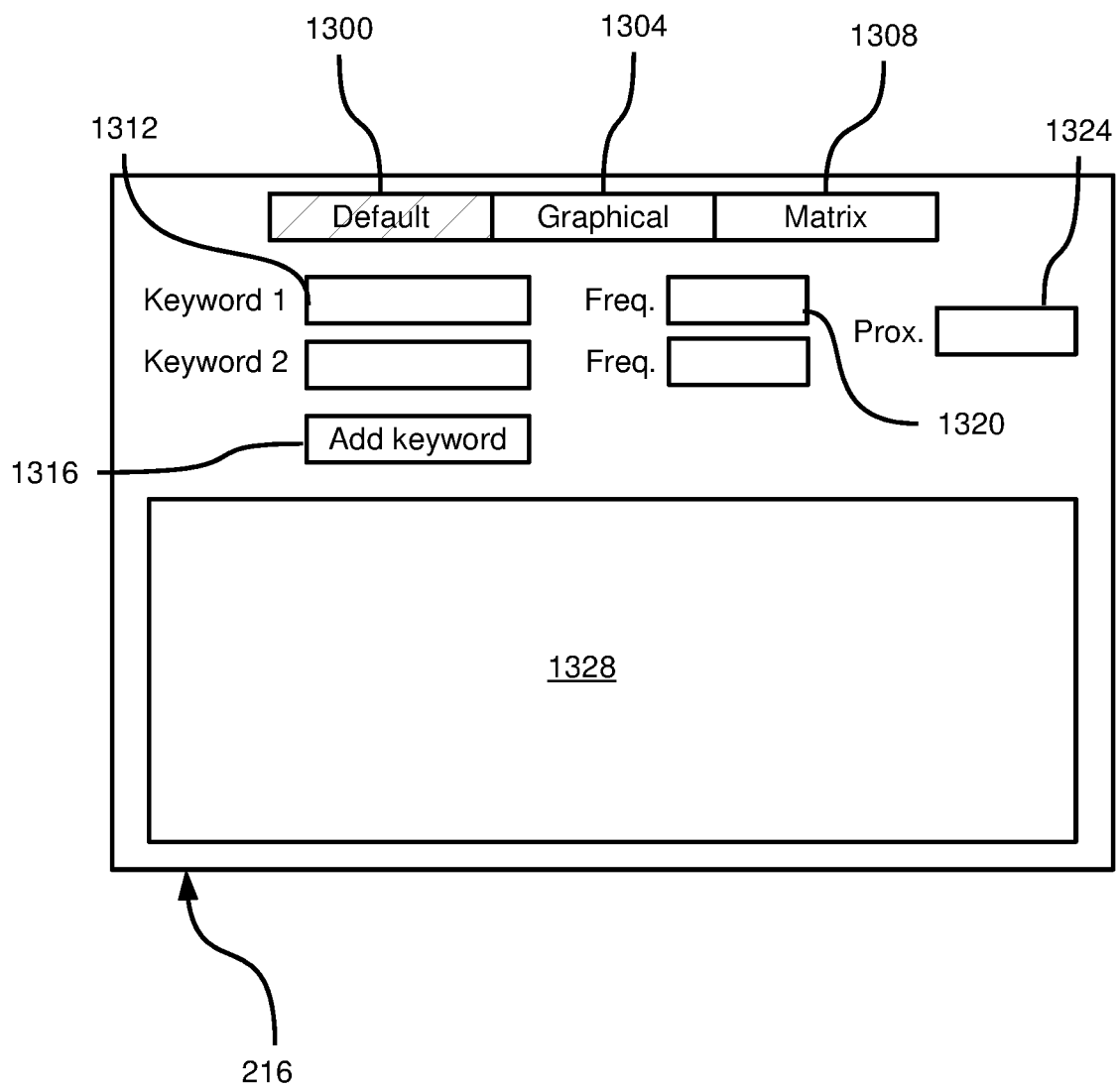
FIGS. 12-14 depict example search interfaces employed in the performance of the method of FIG. 11, according to a non-limiting embodiment.

Referring to FIG. 12, an example search interface is shown as presented on display 216. As seen in FIG. 12, the interface includes three selectable interface elements 1300, 1304 and 1308 each corresponding to a respective one of the available search types. As will be seen below, each search type corresponds to a different search interface.

The interface of FIG. 12 corresponds to selectable element 1300 (which is illustrated as being highlighted or active). The search type shown in FIG. 12 is referred to herein as a "default" search, though it will be apparent that any other suitable name may be assigned to the search types and presented on elements 1300, 1304 and 1308. At block 1205, client device 104 is configured to receive a selection of one of elements 1300, 1304 and 1308 and to update the interface accordingly (examples of each search type will be discussed below).

At block 1210, client device 104 is configured to receive a selection of search parameters. More specifically, processor 200 is configured to receive selected search parameters, via the selection of elements of the presented search interface, from an input device such as keyboard and mouse 212. In general, the search parameters received at block 1210 correspond to at least one content class identifier and a frequency value for each class identifier. The search parameters can also include parameters corresponding to proximity values for one or more pairs of selected class identifiers, although some or all proximity parameters can be omitted (i.e. it is not necessary for the search parameters to specify proximity).

As will be discussed below, the search parameters received need not exactly match the frequency values and proximity values discussed above. Instead, the search parameters received at block 1210 can include ranges or thresholds for frequency and proximity.

Referring again to FIG. 12, the default search interface includes at least one class identifier field 1312 for receiving a selection of a class identifier. A selectable element 1316 is selectable to update the search interface with an additional class identifier field (two class identifier fields are shown). In the present embodiment, client device 104 is configured to receive a class identifier by receiving characters (e.g. via keyboard 212) in field 1312, and comparing the characters to a stored list of available content class identifiers. Client device 104 is configured to generate a dynamic list, such as a dropdown menu, of class identifiers that contain the characters entered in field 1316. The drop-down menu may be generated based on a list of content classes stored at client 104, or based on a list received at client device 104 from server 116.

Search parameters corresponding to frequency and proximity values are received, respectively, in a frequency field 1320 and a proximity field 1324 of the interface shown in FIG. 12. In particular, client device 104 is configured to update the interface to include a frequency field for each class identifier field, and a proximity field for each pair of class identifier fields. In the present embodiment, fields 1320 and 1324 are populated with parameters selected from drop-down menus. For example, parameters for each of fields 1320 and 1324 can be selected from a set of options that each represent a range of frequency or proximity values (e.g. "exists" for non-zero frequency or proximity, "low", "medium" and "high"). In other embodiments, various other sets of options can be employed, having any suitable degree of granularity, including options matching frequency and proximity values as stored at server 116. As will now be apparent, in the present embodiment proximity field 1324 specifies only the proximity between the class identifiers selected in the two adjacent keyword fields.

Figure 13:
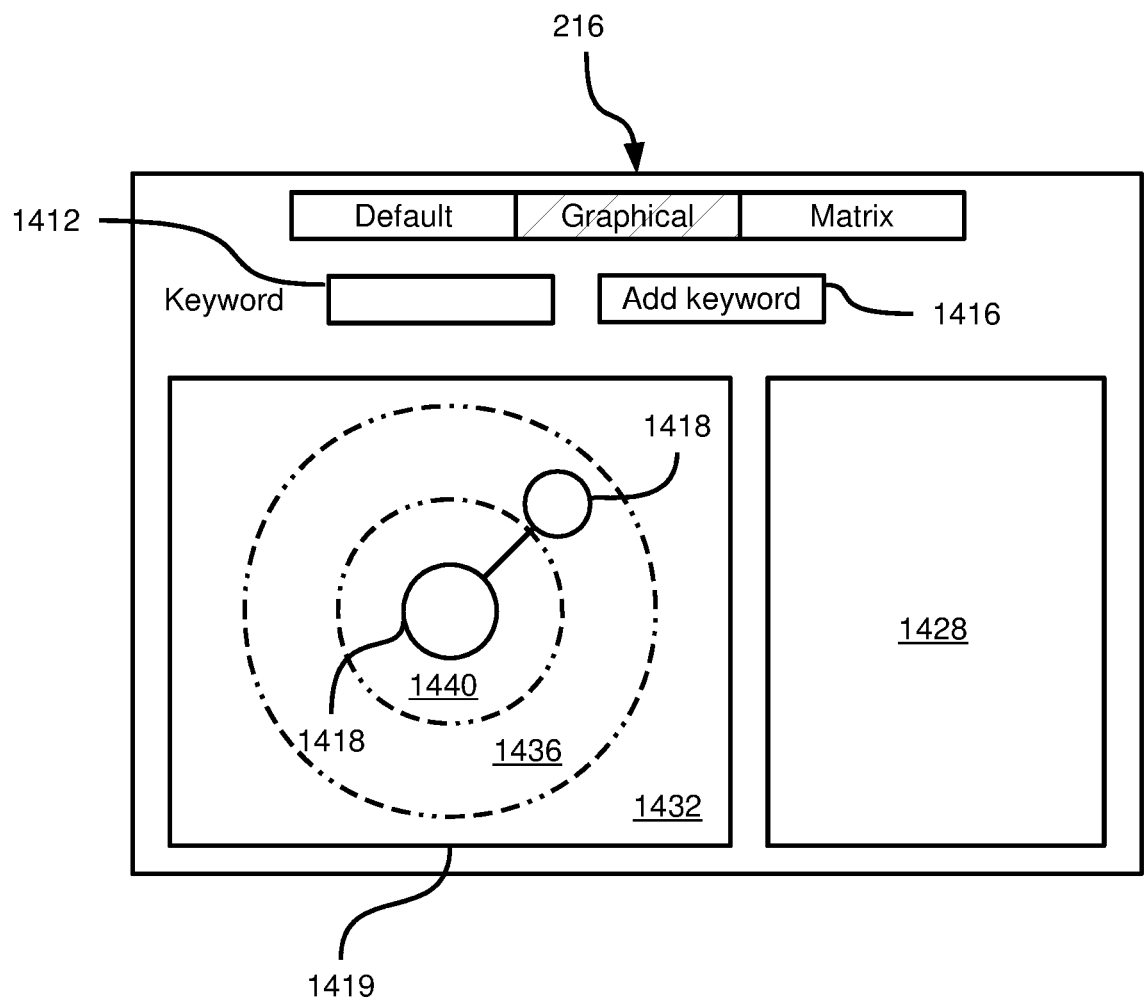

Referring now to FIG. 13, the graphical search interface is depicted. In the graphical search interface, client device 104 is configured to receive the selection of a class identifier in a field 1412, as described above in connection with FIG. 12. However, upon selection of the "add keyword" element 1416, a graphical element 1418 for the selected class identifier is generated in a frequency and proximity input area 1419. The first element 1418 displayed is referred to as an anchor element—proximity input, described below, is received relative to the anchor element. Client device 104 is configured to receive input data defining a size of each element 1418, as well as a distance between each element 1418 added after the anchor element 1418, and the anchor element 1418 itself. In other embodiments, client device 104 is configured to receive input data defining distances between each pair of elements 1418, rather than only the anchor element 1418 and other elements.

As will now be apparent, the above-mentioned size and distance can be converted via the execution of application 208 into frequency and proximity values, or ranges thereof. For example, in the embodiment illustrated, the distance received as input at client device 104 serves to place an element 1418 in one of a plurality of regions displayed by client device 104. Each region corresponds to a range of proximity values. Thus, an outer region 1432 indicates low or null proximity (i.e. search results with any proximity between the selected class identifiers will be retrieved), a middle region 1436 indicates that a medium proximity between the relevant class identifiers must be satisfied by search results, and an inner region 1440 indicates that a high proximity between the relevant class identifiers must be satisfied by search results. The low, medium and high proximity ranges (or any other suitable ranges) can be preconfigured at either of client device 104 and server 116.

Figure 14:
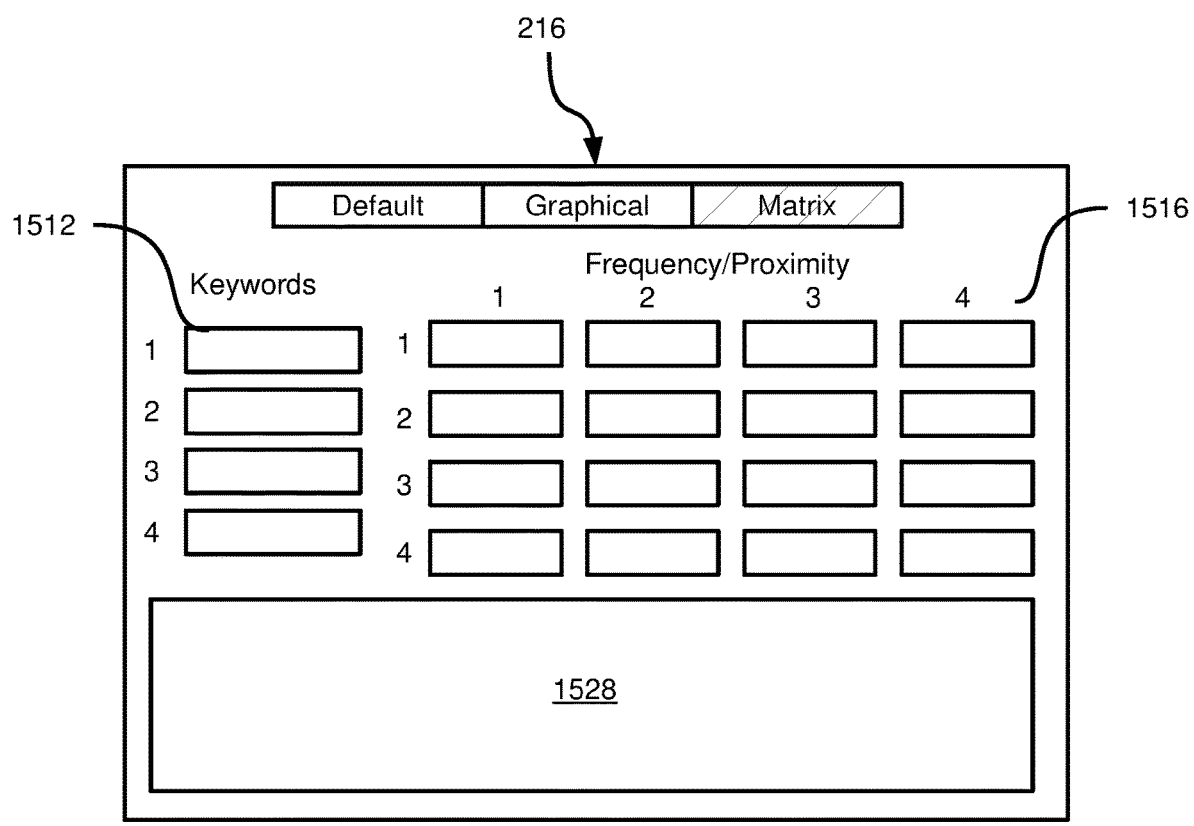

Turning to FIG. 14, the matrix search interface is depicted. The matrix search interface includes a plurality of class identifier fields 1512, each of which can receive a selection of a class identifier (as described above). Additionally, the matrix search interface includes an input matrix 1516 for receiving search parameters corresponding to frequency and proximity values. As will now be apparent, the input matrix 1516 mirrors the structure of Table 2. Thus, client device 104 is configured to receive, via input matrix 1516, values or ranges thereof (e.g. via drop-down options discussed earlier) corresponding to frequency values along the diagonal, and corresponding to proximity values in the non-trace positions of the matrix.

Returning to FIG. 11, at block 1215 client device 104 is configured to transmit a search request to server 116. The search request includes the selected class identifiers, as well as the frequency and proximity search parameters as received at block 1210. In embodiments where the frequency and proximity search parameters represent ranges of frequency and proximity values, client device 104 can convert the ranges to boundary values for inclusion in the search request. Alternatively, client device 104 can simply include the parameters representing ranges in the search request, for conversion at server 116. When a single proximity search parameter is received for a pair of class identifiers (as in the default and graphical search interfaces), conversion to proximity values includes conversion of the search parameter to two equal proximity values (or ranges thereof), corresponding to the proximity values for the two permutations of the relevant class identifier pair. That is, at server 116 the pair A-B has a proximity value, and the pair B-A has another (not necessarily equal) proximity value. Meanwhile, only one distance is provided between elements 1418 in FIG. 13. Therefore, to convert the single distance into proximity values, client device 104 or server 116 is configured to set the A-B proximity value and the B-A proximity value as being equal.

At block 1220, server 116 is configured to receive the search request, and if necessary, to convert frequency or proximity search parameters representing ranges of values into boundary values. At block 1225, server 116 is configured to retrieve search data from memory 234 for each previously processed document. At block 1230, server 116 is configured to select any documents having search data (i.e. class identifiers, frequency and proximity values) matching the search request. Server 116 is configured to transmit to client device 104 document identifiers for any documents that match the search request. Server 116 can also be configured to transmit the above-mentioned graphical representations of the documents identified in the search results, for presentation at client device 104.

At block 1235, client device 104 is configured to present the search results within the search interface. For example, results areas 1328, 1428 and 1528 are shown in FIGS. 13, 14 and 15 respectively. The search results thus presented can include selectable URLs for directing a request for the relevant document to document storage server 120 (see block 1240).

Although the performance of method 1200 as discussed above divides the blocks of the method between client device 104 and server 116, in other embodiments both the document processing and searching functions can be implemented on the same computing device. In such embodiments, the entirety of method 1200 can be performed on a single device.

Various advantages to the systems and methods described above will now be apparent to those skilled in the art. For example, the use of content classes from which frequency and proximity values are derived permits system 100 to generate search data representing a wide variety of language and enabling searching for complex inter-relations between document topics, without the need for computationally costly full-text indexing.

Variations to the above embodiments are contemplated. For example, in some embodiments, rather than storing bi-directional proximity values for pairs of class identifiers (e.g. B-A and A-B), server 116 can be configured to store only the average of such values. This implementation achieves a reduction in the volume of search data stored (for example, one half of the matrix shown in Table 2 can be eliminated as only a single non-trace cell is necessary for each pair of class identifiers).

In further embodiments, search data from different sets of documents (e.g. for different topics, different sets of search users, and the like) may be stored and accessed separately at server 116. For example, client device 104 may specify in the search request which set of search data to restrict the search to. This variation may be also extended to maintaining separate sets of low-relevance and content class data corresponding to the separate sets of search data.

In further embodiments, server 116 can be configured to perform certain portions of method 300 independently of the remaining portions. For example, server 116 can receive (from any suitable source) class identifiers with frequency and proximity values, without needing to compute that data internally. Server 116 can then perform block 345 independently of the remainder of method 300, thus generating graphical representations of search data generated elsewhere.

Those skilled in the art will appreciate that in some embodiments, the functionality of processors 200 and 230 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A computer-implemented method, comprising:
   obtaining, at a processor, document text from a document stored in a memory connected to a processor, wherein the document text comprises a plurality of strings;
   generating condensed document text by:
   retrieving preconfigured non-content strings from the memory;
   discarding a first portion of the plurality of strings responsive to detecting that the first portion matches any of the non-content strings;
   retrieving preconfigured non-significant strings from the memory; and
   discarding a second portion of the plurality of strings responsive to detecting that the second portion matches any of the non-significant strings;

in the condensed document text, replacing a plurality of content strings with respective ones of a plurality of preconfigured content class identifiers to generate streamlined document text;

determining respective frequency values indicating the frequency of the content class identifiers in the streamlined document text;

determining a proximity value for at least one pair of the content class identifiers in the streamlined document text;

storing a subset of the frequency values and the proximity value in the memory in association with a document identifier;

receiving a search request including at least one content class identifier and a corresponding frequency parameter;

retrieving the stored subset of frequency values and proximity value;

determining whether the subset of frequency values and proximity value satisfies the search request; and when the subset of frequency values and proximity value satisfies the search request, returning the document identifier associated with the subset of frequency values and proximity value.

2. The method of claim 1, wherein obtaining the document text comprises retrieving the document and converting the document to a plain text format.

3. The method of claim 1, wherein the replacing comprises:

retrieving content class data from the memory, the content class data including the content class identifiers, and for each content class identifier, a plurality of corresponding member content strings;

responsive to determining that each of the content strings matches any of the member content strings, replacing the content string with the corresponding content class identifier.

4. The method of claim 3, further comprising:

determining whether any remaining strings from the streamlined document text do not match any member content strings;

updating the content class data by assigning at least one of the remaining strings to a content class identifier.

5. The method of claim 1, wherein the document identifier includes a uniform resource location (URL).

6. The method of claim 1, further comprising:

storing the streamlined document text in association with the subset of the frequency values and the proximity value.

7. The method of claim 1, wherein determining the respective frequency values comprises:

for each content class identifier in the streamlined document text, determining a count of the content class identifier; and normalizing the count relative to a length of the streamlined document text.

8. The method of claim 7, wherein the length of the streamlined document text is a total number of content class identifiers in the streamlined document text.

9. The method of claim 1, wherein determining the proximity value comprises:

determining a number of content class identifiers in the streamlined document text between a first member of the pair and a second member of the pair.

10. The method of claim 9, wherein determining the proximity value further comprises:

repeating the determining a number of content class identifiers between a first member of the pair and a second member of the pair for a plurality of instances of the pair; and averaging the determined numbers of content class identifiers.

11. The method of claim 1, wherein determining the proximity value comprises:

selecting a subset of the frequency values;

generating a plurality of pairs of content class identifiers corresponding to the subset of frequency values; and determining a proximity value for each of the pairs.

12. The method of claim 1, further comprising:

generating a graphical representation of the subset of the frequency values and the proximity value.

13. A computing device, comprising:

a memory; and a processor interconnected with the memory, the processor configured to execute computer readable instructions stored in the memory to:

obtain document text from a document stored in the memory, wherein the document text comprises a plurality of strings;

generate condensed document text by:

retrieving preconfigured non-content strings from the memory;

discarding a first portion of the plurality of strings responsive to detecting that the first portion matches any of the non-content strings;

retrieving preconfigured non-significant strings from the memory; and discarding a second portion of the plurality of strings responsive to detecting that the second portion matches any of the non-significant strings;

in the condensed document text, replace a plurality of content strings with respective ones of a plurality of preconfigured content class identifiers to generate streamlined document text;

determine respective frequency values indicating the frequency of the content class identifiers in the streamlined document text;

determine a proximity value for at least one pair of the content class identifiers in the streamlined document text;

store a subset of the frequency values and the proximity value in the memory in association with a document identifier;

receive a search request including at least one content class identifier and a corresponding frequency parameter;

retrieve the stored subset of frequency values and proximity value;

determine whether the subset of frequency values and proximity value satisfies the search request; and when the subset of frequency values and proximity value satisfies the search request, return the document identifier associated with the subset of frequency values and proximity value.

* * * * *